Patented Sept. 28, 1937

2,094,078

UNITED STATES PATENT OFFICE 2,094,078

DYESTUFF INTERMEDIATES

Clifford Paine, Handforth, and Wilfred Archibald Sexton, Manchester, England, assignors to Imperial Chemical Industries Limited, a corporation of Great Britain No Drawing. Application June 27, 1934, Serial No. 732,736. In Great Britain July 4, 1933

15 Claims. (Cl. 260—129)

According to this invention we manufacture the new dyestuff intermediate 1-amino-6-sulfo-2-naphthyl-($\beta$-ethoxyethyl) ether by converting $\beta$-naphthol into its $\beta$-ethoxyethyl ether, nitrating, reducing, and sulfonating.

The following example in which parts are by weight illustrates but does not limit the invention.

*Example.—Preparation of 2-naphthyl-($\beta$-ethoxyethyl) ether*

86 parts of 100% sulfuric acid are added with cooling and stirring to 270 parts of glycol monoethyl ether. 288 parts of beta-naphthol are then added and the whole is heated with stirring for 10 hours at 97–100° C. At the end of this time, the reaction mixture is poured on to 1000 parts of cold water. The heavy oily layer is separated, stirred with 1000 parts of warm water and treated with caustic soda until alkaline. It is then separated and purified by distillation in vacuo. The yield is good.

2-naphthyl-($\beta$-ethoxyethyl) ether is a liquid at ordinary temperatures, B. P. 215°/36 mm.

*Sulfonation to 6-sulfo-2-naphthyl-($\beta$-ethoxyethyl) ether*

54 parts of the ether prepared as above are dissolved in 162 parts of tetrachloroethane and the solution stirred at 95–100° C. 30.6 parts of chlorosulfonic acid are added gradually during half an hour with stirring and the temperature kept at 95–100° C. for a further 2 hours. The reaction mixture is poured into 200 parts of water and the tetrachloroethane layer separated and washed with 100 parts of water. The combined aqueous portions are made neutral by addition of caustic soda, heated to redissolve the precipitated sodium sulfonate, treated with 10% of sodium sulfate and allowed to cool. The sodium salt of 6-sulfo-2-naphthyl-($\beta$-ethoxyethyl) ether crystallizes out and is filtered off and dried.

It will be understood by persons skilled in the art that the sodium salt of the sulfo-naphthyl ether is easier to work with, due to its excellent solubility, than the free acid.

*Nitration to 1-nitro-6-sulfo-2-naphthyl-($\beta$-ethoxyethyl) ether*

44 parts of the sodium salt of the sulfonated acid prepared as above are finely powdered and stirred at 50° C. with 132 parts of acetic acid. A mixture of 13.4 parts of 94% nitric acid with 14 parts of acetic acid is added gradually during 1 hour and the whole stirred 15 hours at 50° C. On cooling, the nitro compound separates and is filtered off and washed free from acid by means of brine.

*Reduction to 1-amino-6-sulfo-2-naphthyl-($\beta$-ethoxyethyl) ether*

The above nitration product is dissolved in 200 parts of hot water and added during half an hour to a stirred mixture of 50 parts of iron, 50 parts water and 8 parts of 36% hydrochloric acid at 90–95° C. Reduction is complete in 2 hours, the mixture is then made alkaline by means of sodium carbonate, filtered hot from the sludge and the latter extracted twice with boiling water. The combined filtrate and washings are evaporated to crystallizing point, cooled and the product filtered off, washed with a little cold water and dried.

We claim:

1. 1-amino-6-sulfo-2-naphthyl-($\beta$-ethoxyethyl) ether.

2. The process for the manufacture of 1-amino-6-sulfo-2-naphthyl-($\beta$-ethoxyethyl) ether which comprises converting $\beta$-naphthol into its $\beta$-ethoxyethyl ether by reaction with glycol monoethyl ether, monosulfonating, mononitrating, and reducing.

3. In the process of making a new composition of matter the steps which involve reacting at a temperature of about 100° C. for about ten hours beta-naphthol with the contents of a bath made by mixing 100% sulfuric acid with glycol-monoethyl ether, and separating out the ether, dissolving the ether in tetrachlorethane, reacting it with chlorosulfonic acid at a temperature of 95–100° C., separating out the solvent, reacting the sulfo ether with sodium sulfate, crystallizing out the sodium salt of 6-sulfo-2-naphthyl (beta-ethoxyethyl) ether, mixing the said sodium salt with acetic acid, reacting it with a mixture of nitro and acetic acids at 50° C. for about fifteen hours and separating out the nitro compound, dissolving the said nitro compound in hot water, treating it with iron and hydrochloric acid at about 95° C. and separating out the 1-amino-6-sulfo-2-naphthyl (beta-ethoxyethyl) ether.

4. In the process of making a new composition of matter the steps which involve reacting at a temperature of about 100° C. for about ten hours beta-naphthol with the contents of a bath made by mixing 100% sulfuric acid with glycol-monoethyl ether, and separating out the ether, dissolving the ether in tetrachlorethane, reacting it with chlorosulfonic acid at a temperature of 95–100° C., separating out the solvent, reacting the sulfo ether with sodium sulfate, crystallizing out the sodium salt of 6-sulfo-2-naphthyl (beta-ethoxyethyl) ether, mixing the said sodium salt with acetic acid, reacting it with a mixture of nitro and acetic acids at 50° C. for about fifteen hours and separating out the nitro compound, dissolving the said nitro compound in hot water, reducing the nitro group and separating out the 1-amino-6-sulfo-2-naphthyl (beta-ethoxyethyl) ether.

5. In the process of making a new composition of matter the steps which involve reacting at a temperature of about 100° C. for about ten hours beta-naphthol with the contents of a bath made by mixing 100% sulfuric acid with glycol-monoethyl ether, and separating out the ether, dissolving the ether in tetrachlorethane, reacting it with chlorosulfonic acid at a temperature of 95–100° C., separating out the solvent, reacting the sulfoether with sodium sulfate, crystallizing out the sodium salt of 6-sulfo-2-naphthyl (beta-ethoxyethyl) ether, mixing the said sodium salt with acetic acid, reacting it with a mixture of nitro and acetic acids at 50° C. for about fifteen hours and separating out the nitro compound, dissolving the said nitro compound and reducing the nitro compound.

6. In the process of making a new composition of matter useful as an intermediate in the manufacture of dyestuffs the steps which comprise forming 1-amino-6-sulfo-2-naphthyl (beta-ethoxyethyl) ether by reducing 1-nitro-6-sulfo-2-naphthyl (beta-ethoxyethyl) ether.

7. In the process of making a new composition of matter the steps which involve reacting at a temperature of about 100° C. for about ten hours beta-naphthol with the contents of a bath made by mixing 100% sulfuric acid with glycol-monoethyl ether, and separating out the ether, dissolving the ether in tetrachlorethane, reacting it with chlorosulfonic acid at a temperature of 95–100° C., separating out the solvent, reacting the sulfoether with sodium sulfate, crystallizing out the sodium salt of 6-sulfo-2-naphthyl (beta-ethoxyethyl) ether, mixing the said sodium salt with acetic acid, reacting it with a mixture of nitro and acetic acids at 50° C. for about fifteen hours and reducing the so-formed nitro compound.

8. In the process of making a new composition of matter the steps which involve reacting at a temperature of about 100° C. for about ten hours beta-naphthol with the contents of a bath made by mixing 100% sulfuric acid with glycol-monoethyl ether, and separating out the ether, dissolving the ether in tetrachlorethane, reacting it with chlorosulfonic acid at a temperature of 95–100° C., separating out the solvent, reacting the sulfoether with sodium sulfate, crystallizing out the sodium salt of 6-sulfo-2-naphthyl (beta-ethoxyethyl) ether, mononitrating the said sodium salt and reducing the so-formed nitro compound.

9. In the process of making an intermediate useful in the manufacture of dyestuffs the steps which consist in mono-nitrating the sodium salt of 6-sulfo-2-naphthyl (beta-ethoxyethyl) ether and reducing the so-formed nitro compound.

10. In the process of making a new composition of matter the steps which involve reacting at a temperature of about 100° C. for about ten hours beta-naphthol with the contents of a bath made by mixing 100% sulfuric acid with glycol-monoethyl ether, and separating out the ether, monosulfonating the said naphthyl ether and forming the sodium salt thereof, crystallizing out the so-formed salt, mononitrating it, and reducing the so-formed nitro compound.

11. In the process of making a composition of matter useful as an intermediate in the manufacture of dyes the steps which comprise monosulfonating naphthyl (betal-ethoxyethyl) ether, forming the sodium salt thereof, mononitrating the said salt and reducing the so-formed nitro compound.

12. In the process of making a new composition of matter the steps which involve etherifying beta-naphthol with glycol-monoethyl ether, separating out the naphthyl ether, monosulfonating the naphthyl ether, mononitrating the naphthyl-sulfo-ether, and reducing the nitrated naphthyl-sulfo-ether.

13. The intermediate product 1-nitro-6-sulfo-2-naphthyl (beta-ethoxyethyl) ether.

14. The sodium salt of 1-nitro-6-sulfo-2-naphthyl (beta-ethoxyethyl) ether.

15. The compound represented by the formula:

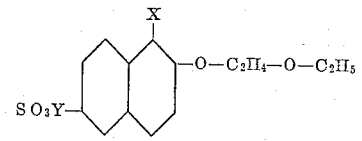

in which X is one of a group consisting of nitro, and amino and Y is one of the group consisting of hydrogen and an alkali metal.

CLIFFORD PAINE.
WILFRED ARCHIBALD SEXTON.